US009815190B2

United States Patent
Kim et al.

(10) Patent No.: US 9,815,190 B2
(45) Date of Patent: Nov. 14, 2017

(54) ROBOT CLEANER, ROBOT CLEANER SYSTEM AND CONTROL METHOD OF THE SAME

(71) Applicant: LG ELECTRONICS INC., Seoul (KR)

(72) Inventors: Bongju Kim, Seoul (KR); Seongeun Cho, Seoul (KR); Sangmok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 386 days.

(21) Appl. No.: 14/575,911

(22) Filed: Dec. 18, 2014

(65) Prior Publication Data

US 2015/0173578 A1 Jun. 25, 2015

(30) Foreign Application Priority Data

Dec. 19, 2013 (KR) .................. 10-2013-0159727

(51) Int. Cl.
*A47L 9/28* (2006.01)
*B25J 9/00* (2006.01)

(52) U.S. Cl.
CPC ........... *B25J 9/0003* (2013.01); *A47L 9/2894* (2013.01); *A47L 2201/04* (2013.01); *Y10S 901/01* (2013.01); *Y10S 901/40* (2013.01)

(58) Field of Classification Search
CPC ... B25J 9/0003; A47L 9/2894; A47L 2201/04; Y10S 901/01; Y10S 901/40
See application file for complete search history.

(56) References Cited

U.S. PATENT DOCUMENTS

| 2006/0069465 | A1  | 3/2006  | Saeki |
|---|---|---|---|
| 2007/0250212 | A1* | 10/2007 | Halloran .................. A47L 5/30 700/245 |
| 2013/0056032 | A1  | 3/2013  | Choe et al. |
| 2013/0060379 | A1* | 3/2013  | Choe ..................... G06N 3/008 700/245 |
| 2013/0237148 | A1  | 9/2013  | McCann et al. |

(Continued)

FOREIGN PATENT DOCUMENTS

| CN | 1381339 | 11/2002 |
|---|---|---|
| CN | 1381340 | 11/2002 |

(Continued)

OTHER PUBLICATIONS

Chinese Office Action dated Aug. 3, 2016 issued in Application No. 201410802274.2 (with English translation).

(Continued)

*Primary Examiner* — Dung Van Nguyen
(74) *Attorney, Agent, or Firm* — KED & Associates, LLP

(57) ABSTRACT

The robot cleaner includes a case, a suction device provided in the case, a suction nozzle for sucking dust from a floor by driving of the suction device, a dust collection device for collecting foreign substances contained in the air sucked via the suction nozzle, a wheel unit to allow movement, a main controller for controlling the driving of the suction device and the wheel unit, a Wi-Fi module provided in the case to provide Access Point (AP), and a NFC module provided in the case to provide an external terminal with AP information for accessing to the AP through NFC communication.

13 Claims, 9 Drawing Sheets

(56) References Cited

U.S. PATENT DOCUMENTS

| | | | | |
|---|---|---|---|---|
| 2013/0326839 A1* | 12/2013 | Cho | ................ | A47L 9/2805 15/319 |
| 2014/0116469 A1* | 5/2014 | Kim | ................ | A47L 9/2894 134/18 |
| 2014/0336863 A1* | 11/2014 | So | ................ | G05D 1/0219 701/28 |

FOREIGN PATENT DOCUMENTS

| | | |
|---|---|---|
| CN | 1753040 | 3/2006 |
| CN | 101084817 | 12/2007 |
| CN | 102053623 | 5/2011 |
| CN | 202136279 | 2/2012 |
| CN | 102883315 | 1/2013 |
| CN | 103054522 | 4/2013 |
| CN | 103211557 | 7/2013 |
| CN | 203042143 | 7/2013 |
| EP | 1 712 970 A2 | 10/2006 |
| KR | 10-2012-0118824 | 10/2012 |

OTHER PUBLICATIONS

European Search Report issued in Application No. 14199065.5 dated May 8, 2015.
Chinese Office Action dated Jun. 20, 2017 issued in Application No. 201410802274.2.

* cited by examiner

ROBOT CLEANER, ROBOT CLEANER SYSTEM AND CONTROL METHOD OF THE SAME

CROSS-REFERENCE TO RELATED APPLICATION

This application claims priority under 35 U.S.C. §119 to Korean Application No. 10-2013-0159727, filed on Dec. 19, 2013, whose entire disclosure is hereby incorporated by reference.

BACKGROUND

1. Field

The present disclosure relates to a robot cleaner, a robot cleaner system and a control method of the same, more particularly, to a robot cleaner of which a cleaning history may be figured out easily by a user through an external terminal, a robot cleaner system and a control method of the same.

2. Background

A robot cleaner is an electric home appliance for cleaning a floor or carpet of a room. The robot cleaner includes an air suction device provided in a cleaner case and the air suction device consists of a motor and a fan. After sucking external air containing foreign matters by driving the air suction device, the robot cleaner separates the foreign matters to collect dust and exhausts the clean air having foreign substances separated there from.

A vacuum cleaner may include a manual vacuum cleaner directly operated by a user and a robot cleaner that performs cleaning for itself, without user's operation.

The robot cleaner sucks foreign matters (e.g., dust) from the floor in a region set to clean, while driving the region itself. Also, the robot may perform cleaning, while automatically driving a cleaning region with using an obstacle sensor or while manually driving via a remote control device wirelessly linked to the robot cleaner.

However, it is difficult to expand controlling of the robot cleaner using the remote control. In other words, it is difficult to input other functions through the remote control, except the input set in the remote control. Methods for controlling a robot cleaner through a smart phone, not a remote control exclusively used for the robot cleaner are on the rise.

Recently, a robot cleaner having a camera module mounted therein is provided and such a camera module may generate image information on a room. Accordingly, the security of the robot cleaner can be important. When the robot cleaner is hacked from outside, image information about a room may be exposed to a hacker via a camera module.

As a result, a robot cleaner and a robot cleaner system including the same need to be provided which can be controlled by the user easily via a smart phone, with an enhanced security performance.

Meanwhile, such the robot cleaner generally performs cleaning, while automatically driving. In many instances, even when the user is away from home, the robot cleaner cleans the room, while driving automatically. In other words, the robot cleaner may not often perform cleaning in accordance with the user's direct operation.

Accordingly, it is difficult for the user to check whether the robot cleaner performs cleaning or not. It is also difficult to notice whether the robot cleaner completes the cleaning through the house, in other words, an overall cleaning area to the user.

BRIEF DESCRIPTION OF THE DRAWINGS

The embodiments will be described in detail with reference to the following drawings in which like reference numerals refer to like elements wherein.

DETAILED DESCRIPTION

Figure 1:
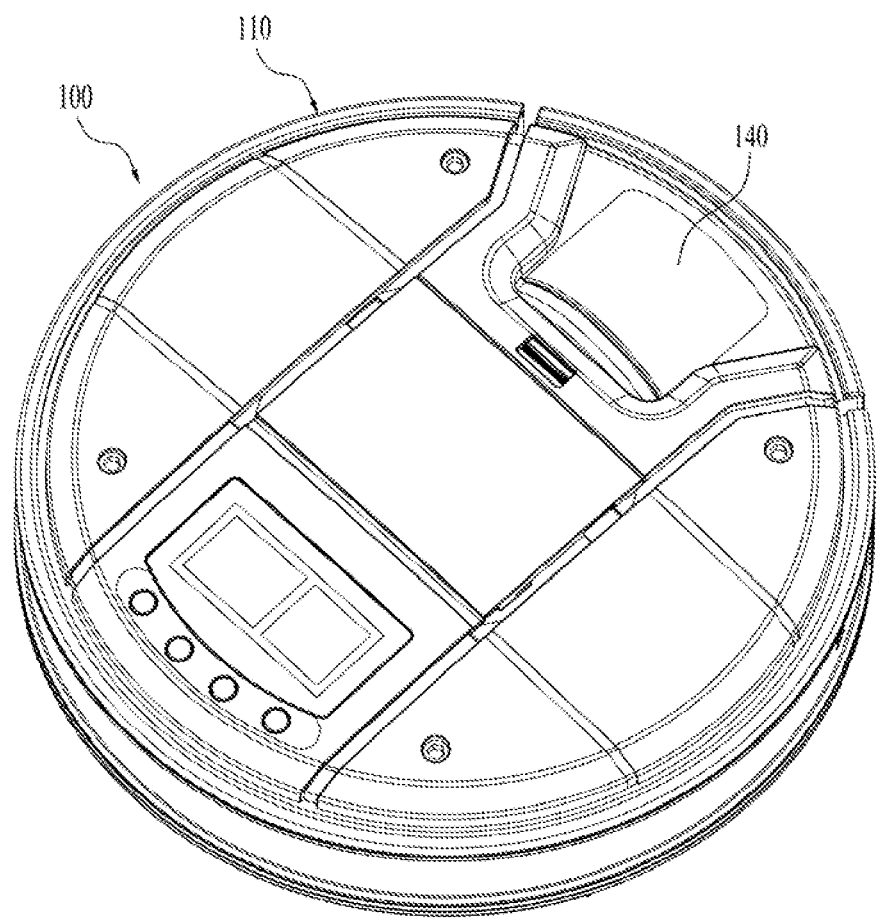
FIG. 1 is a perspective diagram illustrating a robot cleaner according to one embodiment of the disclosure.
Figure 2:
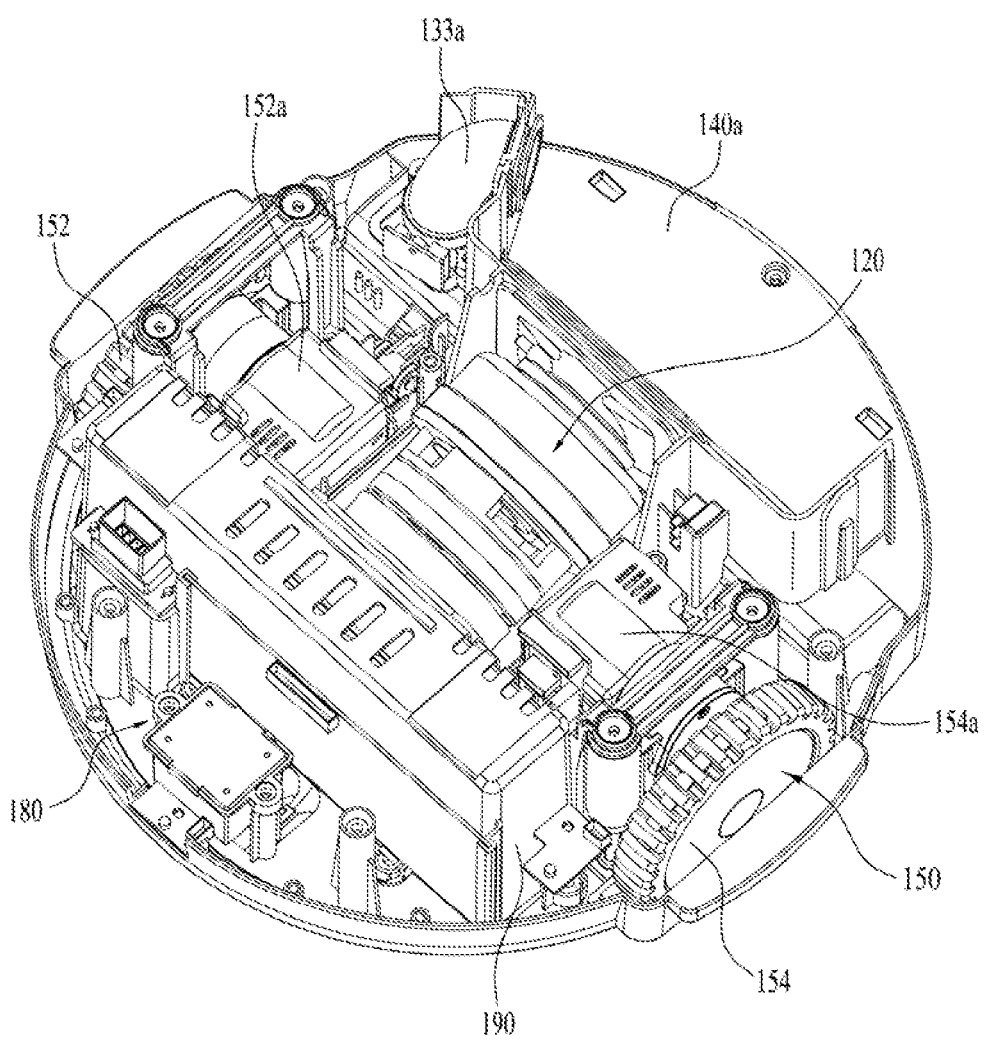
FIG. 2 is a perspective diagram illustrating an inner structure of the robot cleaner according to one embodiment of the disclosure.
Figure 3:
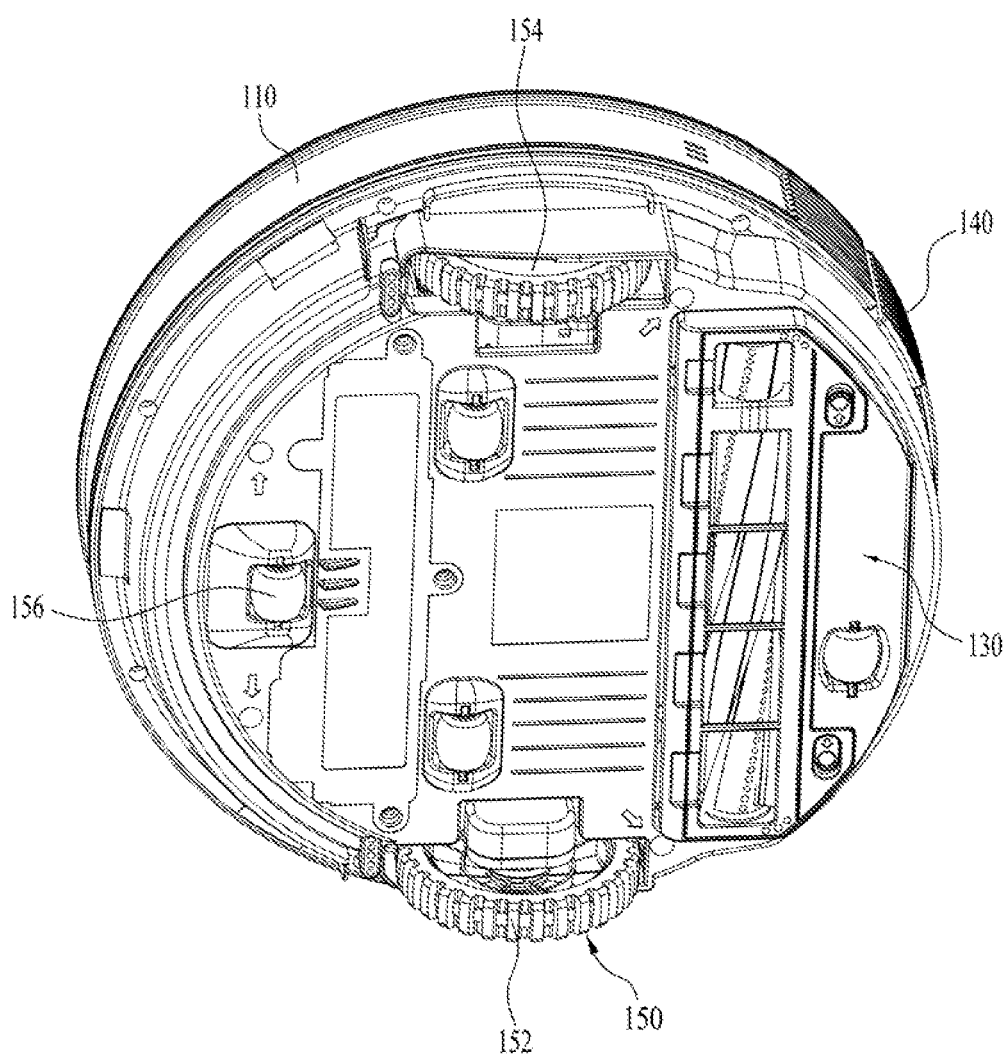
FIG. 3 is a lower perspective diagram of the robot cleaner according to one embodiment of the disclosure.
Figure 4:
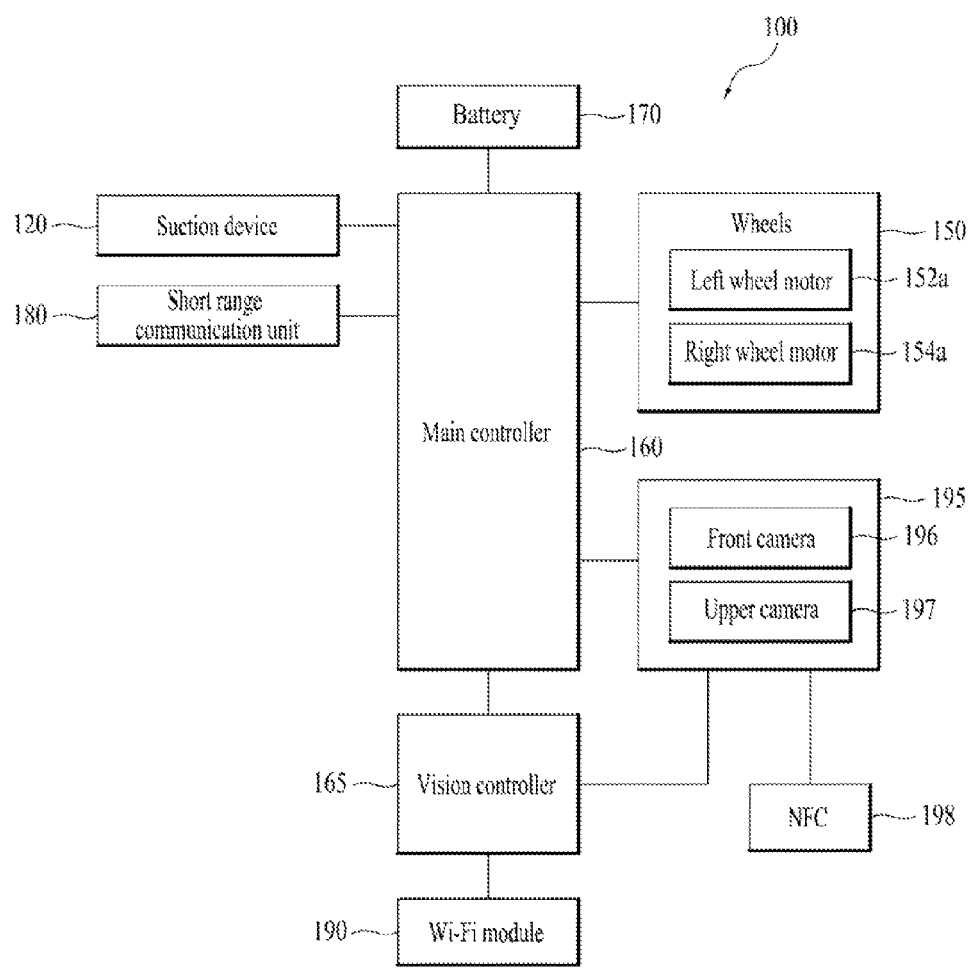
FIG. 4 is a block diagram of a robot cleaner composing a robot cleaner system according to one embodiment of the disclosure.

FIG. 1 is a perspective diagram illustrating a robot cleaner according to one embodiment of the disclosure. FIG. 2 is a perspective diagram illustrating an inner structure of the robot cleaner according to one embodiment of the disclosure. FIG. 3 is a lower perspective diagram of the robot cleaner according to one embodiment of the disclosure. FIG. 4 is a block diagram of a robot cleaner composing a robot cleaner system according to one embodiment of the disclosure.

The robot cleaner 100 may include a cleaner case 110 that defines an exterior appearance of the robot cleaner 100, a suction device 120 provided in the cleaner case 110, a suction nozzle 130 configured to suck dust on the floor via the driving of the suction device 120 and a dust collector 140 configured to collect foreign matters from the sucked air.

The cleaner case 110 of the robot cleaner 100 may be formed in a cylinder shape with a relatively smaller height than a diameter, in other words, a flat cylinder shape. It may have a square shape with circular corners. In the cleaners 110 may be provided the suction device 120, the suction nozzle 130 and the dust collector 140 in communication with the suction nozzle 130.

In an outer circumferential surface of the cleaner case 110 may be provided a sensor (not shown) configured to sense a distance to a wall or an obstacle in a room, a bumper (not shown) configured to damp a shock generated by collision and a wheel unit 150 configured to move the robot cleaner 100. The wheel unit 150 may be projected to the outside from in inside of the case 110, especially, a floor of the room.

The wheel unit 150 may consist of a left driving wheel 152 and a right driving wheel 154 which are installed in both lower portions of the cleaner case 110, respectively. the left and right driving wheels 152 and 154 are configured to be rotated by a left wheel motor 152a and a right wheel motor 154a controllable by a cleaner controller 160, respectively, such that the robot cleaner 100 can change a direction in accordance with the driving of the left and right wheel motors 152a and 154a automatically, while performing room-clean.

At least one auxiliary wheel 156 may be provided in a bottom of the cleaner case 110 and the auxiliary wheel 156 may minimize friction between the robot cleaner 100 and the floor and guide the motion of the robot cleaner 100 simultaneously.

FIG. 4 is a block diagram of a cleaner controller 160 provided in the robot cleaner 100. The cleaner controller 160 linked to various components of the robot cleaner 100 to control the driving of the robot cleaner 100 may be provided in the cleaner case 110, for example, a front portion inside the robot case 110. Also, a battery 170 configured to supply a power to the suction device 120 may be provided in the cleaner case 110, for example, a rear portion inside the robot case 110.

The suction device 120 configured to generate an air suction force may be provided behind the battery 170 and the dust collector 140 may be detachably coupled to a rear portion of a dust collector coupling part provided in a rear portion of the suction device 120.

The suction nozzle 130 may be provided under the dust collector 140 and it may suck foreign matters with air. The suction device 120 may include a fan (not shown) inclinedly installed between the battery 170 and the dust collector 140, with being connected to a motor (not shown) electrically connected to the battery 170 and a shaft of the motor to blow air.

Meanwhile, the suction nozzle 130 may be exposed to a bottom of the cleaner case 110 via a hole (not shown) formed in the bottom of the cleaner case 110, only to contact with the floor of the room.

To control the robot cleaner 100 from a distance, the robot cleaner 100 according to this embodiment may include a wireless communication unit or wireless module 190 that can wirelessly communicate with an external device. Specifically, the wireless communication unit may be Wi-Fi module.

The wireless communication unit 190 may be configured to communicate with an external terminal via Wi-Fi. At this time, the external terminal may be a smart phone having a Wi-Fi module mounted therein and such the external terminal will be described later.

Wi-Fi (Wireless LAN) means short range communication which can wirelessly communicate in a preset short range in a place where AP (Access Point) is installed, using a radio wave or an infrared transmission. Accordingly, the wireless communication unit 190 may be the Wi-Fi module 190 configured to enable Wi-Fi communication with the external terminal.

At this time, the Wi-Fi module 190 may provide AP. In other words, AP may be embedded in the robot cleaner. The external device may directly connect to AP of the robot cleaner, not connecting via an external AP such as an internet router.

To directly perform Wi-Fi communication with the robot cleaner, the external terminal needs authentication to connect to the AP. The external terminal has to figure out information on the robot cleaner and it connects to the AP via the robot cleaner information to get authentication.

The robot cleaner information may include the AP information. The AP information may include SSID (Service Set Identifier) of the AP and the AP information may also include a nick name of the robot cleaner. The AP information may include a security key for access authentication.

The external terminal may access to the robot cleaner via the AP information and Wi-Fi communicate with the robot cleaner after getting authentication, such that the external terminal can control the robot cleaner. In this instance, the controlling of the robot cleaner may include remote-controlling of the driving of the robot cleaner and monitoring of state information on the robot cleaner. Also, the controlling of the robot cleaner may include receiving of the diverse information figured out in the robot cleaner from the external terminal.

As mentioned above, the robot cleaner according to this embodiment supplies self AP to Wi-Fi-communicate with the external terminal directly. In other words, the robot cleaner can Wi-Fi communicate with the external terminal directly, not via external AP.

The robot cleaner may include a camera module 195. Using the camera 195, diverse image information on a room may be generated. Also, a map may be created through the camera 195. In other words, a cleaning map corresponding to a cleaning area may be created.

Specifically, the camera 195 may include a front camera 196 and an upper camera 197. The image information achieved through the camera module 195 may be transmitted to the external terminal. For example, the user may control the robot cleaner, while viewing image information displayed on the external terminal.

If the robot cleaner and the external terminal are in Wi-Fi communication via AP in the house, there is concern about weak security. In other words, when AP information in the house is exposed to a stranger, he or she might control the robot cleaner discretionarily. That means that a stranger could acquire the indoor image information through the robot cleaner discretionarily.

Accordingly, the robot cleaner according to this embodiment may directly Wi-Fi communicate with the external terminal, only to overcome such a security problem. The external terminal and the robot cleaner may Wi-Fi communicate with each other directly through the AP provided by the robot cleaner. That means that the user may directly control the robot cleaner through the external terminal in a preset range of communication areas.

As mentioned above, AP information has to be transmitted to the external terminal to access to the AP of the robot cleaner through the external terminal. For example, the user needs to input the AP information to the external terminal one by one.

However, it is hard or not easy for the user to memorize or directly input AP information. Accordingly, such AP information needs transmitting to the external terminal easily.

The robot cleaner according to this embodiment may include a NFC module having AP information on self AP. Specifically, AP information including SSID of AP is recorded in the NFC module 198 and such the AP information may be provided to the external terminal. A NFC module 198 corresponding to the NFC module 198 of the robot cleaner may be provided even in the external terminal.

The user may execute a specific application to control the robot cleaner through the external terminal. In this process, a process of registering a robot cleaner to control in the external terminal.

For that, the user locates the external terminal near the NFC module 198 of the robot cleaner, such that the AP information of the robot cleaner can be transmitted to the external terminal via NFC communication. When such AP information is registered in the external terminal, the robot cleaner to control is specified.

Once the user selects the robot cleaner to control via the application, the AP information may be transmitted to the robot cleaner and authentication for access to the robot cleaner may be performed.

When the access is authenticated, Wi-Fi communication between the robot cleaner and the external terminal is performed and the user may control the robot cleaner via the Wi-Fi communication, using the external terminal.

The AP information may be recorded in the NFC module 198 of the robot cleaner but wiring is not allowed. In other words, the NFC module 198 allows only reading. In this instance, the NFC module may be configured very simply, because signal transmission with the controller 160 can be excluded and because signal transmission with the Wi-Fi module 190 can be excluded. The NFC module 198 may be configured to transmit only the AP information to the external terminal easily.

Meanwhile, an auxiliary controller different from the controller 160 for controlling the driving of the suction device 120 or the driving unit 150 may be provided. The controller 160 for controlling the driving of the suction device 120 or the driving unit 150 may be called a main controller 160. The main controller 160 may control various sensors or a power device. The auxiliary controller may be the controller for generating location information of the robot cleaner and it may be called the vision controller 165 for convenience sake. The main controller 160 and the vision controller 165 may exchange a signal via serial communication.

The vision controller 165 may generate location information based on the image information of the camera 195. Also, the Wi-Fi module 190 may be mounted in the vision controller 165.

Accordingly, the Wi-Fi module 190 may communicate with the vision controller 165 via serial communication.

The Wi-Fi module 190 may include a wireless LAN card. The wireless LAN card may be loaded in the main controller 160 or the vision controller 165. Specifically, the wireless LAN card may be loaded in the vision controller 165 and the Wi-Fi module 190 may enable serial communication with the vision controller 165.

The main controller 160 and the vision controller 165 may compose an additionally provided microcomputer. When diverse calculations are performed, using the main controller 160, a problem of a slow processing speed might be generated.

Signal transmission and reception via the Wi-Fi module 190 may be controlled by the vision controller 165.

The wireless LAN card may be provided as a USB type and the USB type wireless LAN card may be connected to a board having a USB port. Such a board may form the vision controller 165 or the main controller as the case may be. Accordingly, it is very important to keep the coupling between the wireless LAN card and the board. When the wireless LAN card 192 is decoupled from the board, the communication between the robot cleaner and the external terminal is impossible. The coupling structure will be described in detail later.

Meanwhile, the NFC module 198 may be configured only to record information simply and it may be provided only with the required power. As shown in FIG. 4, the NFC module 198 needs not be directly connected to the main controller 160 or the vision controller 165. In other words, the NFC module 198 may exclude communication with the main controller 160, the vision controller 165 and the Wi-Fi module 190. Accordingly, the robot cleaner having the NFC module 198 may be provided easily.

FIG. 4 illustrates one example of the NFC module 198 provided with only the power by the main controller 160 via the camera module 195.

The robot cleaner 100 according to this embodiment may include a second wireless communication unit 180 which is distinguished from the Wi-Fi module 190 and the NFC module 198 mentioned above. The second wireless communication unit 180 may be also provided for short range wireless communication.

The second wireless communication unit 180 may include a module where short range communication may be performed. Examples of the short range communication include Bluetooth, RFID (Radio Frequency Identification), IrDA (Infrared Data Association), UWB (Ultra Wideband) and ZigBee.

The second wireless communication unit 180 may be provided for short range wireless communication with a recharging base (not shown) of the robot cleaner.

Next, referring to FIGS. 5 through 7, an example of the external terminal 200 for remote controlling the robot cleaner will be described. Hereinafter, it can be said that such the robot cleaner and the external terminal compose a robot cleaner system.

Figure 5:
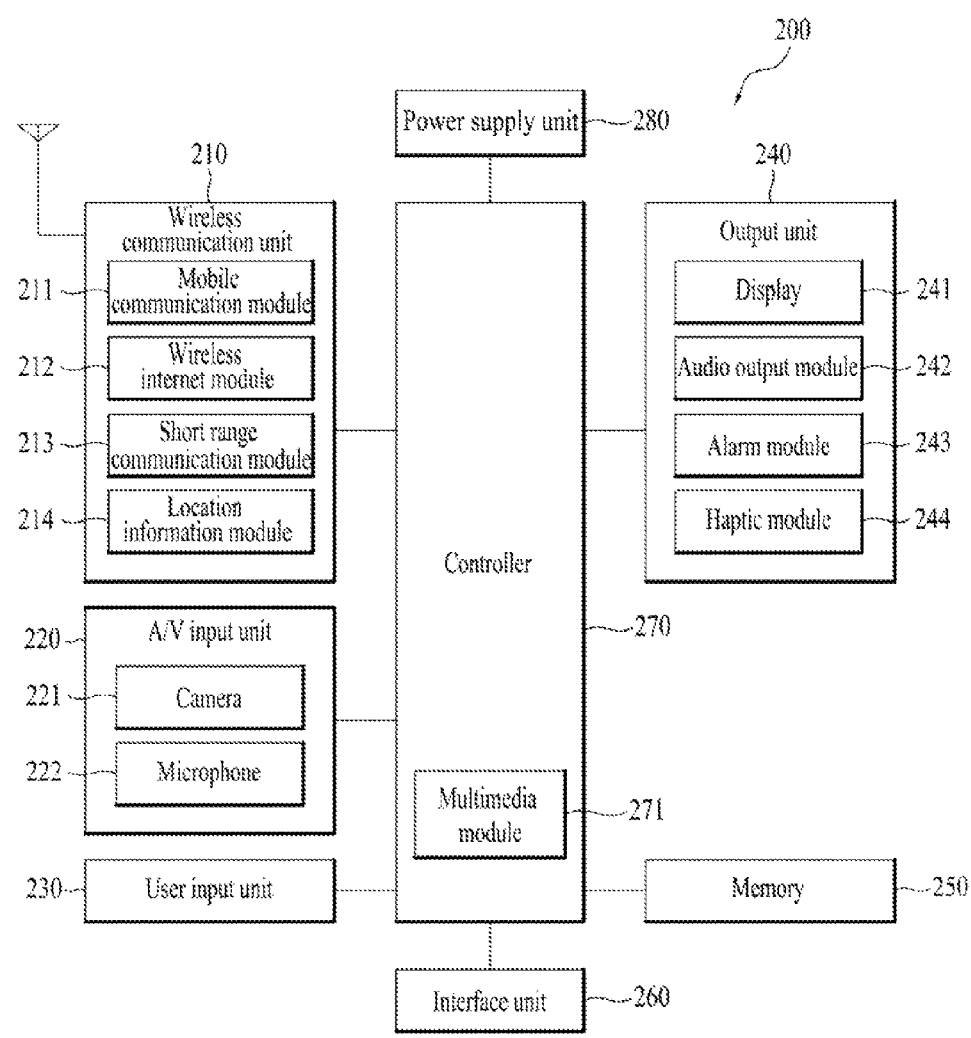
FIG. 5 is a block diagram of a remote control device composing the robot cleaner system according to one embodiment of the disclosure.

FIG. 5 is a block diagram of the external terminal composing the robot cleaner system according to one embodiment of the disclosure.

The external terminal 200 in the present disclosure is a device remote-accessible to the robot cleaner 100 to control the driving of the robot cleaner 100. Examples of the external terminal may include a smart phone, PDA (Personal Digital Assistant) and PMP (Portable Multimedia Player).

For convenient explanation of the disclosure, a smart phone is used as the external terminal 200 of the robot cleaner 100.

The external terminal 200 may include a wireless communication unit 210, AV (Audio/Video) input unit 220, a user input unit 230, an output unit 240, a memory 250, an interface unit 260, a terminal controller 270 and a power supply unit 280. The components shown in FIG. 5 are not necessarily provided and an external terminal 200 having more or less components may be realized.

Each of the components will be described in order.

The wireless communication unit 210 (a second wireless communication unit) may include one or more modules that enables wireless communication between wireless communication systems or wireless communication between the external terminal 200 and a network in which the external terminal 200 is located. For example, the second wireless communication unit 210 may include a mobile communication module 211, a wireless internet module 212 and a short range communication module 213.

The mobile communication module 211 transmits and receives a wireless signal to and from one or more of a base station, an external terminal a server on a mobile communication network. Such a wireless signal may include various types of data in accordance with transmission/receiving of a voice call signal, a video call signal or a texture/multimedia message.

The wireless internet module 212 is a module for wireless internet link and it may be an internal or external element of the external terminal 200. Examples of wireless internet technologies may include WLAN (Wireless LAN) (Wi-Fi), WiBro (Wireless Broadband), WiMax (World Interoperability for Microwave Access) and HSDPA (High Speed Downlink Packet Access). In this instance, the wireless internet module 212 may be a Wi-Fi module and such a Wi-Fi module may access to AP of the robot cleaner mentioned above and enable Wi-Fi communication between the external terminal 200 and the robot cleaner 100.

The short range communication module 213 is a module for short range communication. Examples of short range communication may include Bluetooth, RFID (Radio Frequency Identification), IrDA (Infrared Data Association), UWB (Ultra Wideband), ZigBee or NFC (Near Field Communication). In this instance, the short range communication module 213 may be a NFC module for performing NFC communication with the NFC module of the robot cleaner mentioned above. Accordingly, the user may locate the external terminal 200 near the robot cleaner and receive AP information via NFC communication.

Referring to FIG. 5, the A/V input unit 220 is for inputting an audio signal or a video signal and it may include a camera 221 and a microphone 222. The camera 221 processes image frames of a video file or a still image gained by an image sensor in a video call mode or camera mode. The processed image frame may be displayed on a display 241.

The image frame processed by the camera 221 may be stored in the memory 250 or transmitted to an external device via the second wireless communication unit 210. Two or more cameras 221 may be provided in accordance with a service environment.

The microphone 222 converts an external audio signal received from the outside into electric voice data in a call or record mode and a voice recognition mode. In the call mode, the processed voice data may be converted into a transmittable signal and output to a mobile communication base station by the mobile communication module 211. In the microphone 222 may be realized various types of noise rejection algorisms for reflecting the noise generated while receiving the external audio signal.

The user input unit 230 generates data for the user to control the operation of the external terminal 200. The user input unit 230 may consist of a key pad, a dome switch, a touch pad (static pressure/capacitive type), a jog wheel and a jog switch.

The output unit 240 may generate output associated with visual, auditory or tactual sense. The output unit 240 may include a display 241, an audio output module 242, an alarm unit 243 and a haptic module 244.

The display 241 displays, in other words, outputs the information processed in the external terminal 200. For example, the display 241 may display UI (User Interface) or a GI (Graphic User) interface associated with a call when the external terminal 200 is in a call mode. When the external terminal 200 is a video call mode or a camera mode, the display 241 may display photographing and/or received image or UI and GUI.

The display 241 may include at least one of a liquid crystal display (LCD), a thin film transistor liquid crystal display (TFT LCD), an organic light emitting diode (OLED), a flexible display and a 3D display.

Two or more displays 241 may be provided in accordance with a realizing type of the external terminal 200. For example, a plurality of displays 241 may be arranged in one surface at intervals or integrally, or they may be arranged in different surfaces, respectively.

When the display 241 and a sensor for sensing touch input (hereinafter, 'a touch sensor') form a layer structure (hereinafter, 'a touch screen'), the display 241 may be used as an input device as well as an output device. The touch sensor may have a touch film, a touch sheet and a touch pad.

The touch sensor may be configured to convert a pressure applied to a specific point of the display 241 or change in capacitances generated in a specific point into an electric input signal. The touch sensor may detect a position of input touch and an area of the input touch. Also, it may detect a pressure applied in the touch input.

When the touch input is sensed by the touch sensor, a signal(s) corresponding to the touch may be transmitted to a touch controller. The touch controller processes the signal(s) and transmits data corresponding to the signal(s) to the terminal controller 270. After that, the terminal controller 270 may the terminal controller 270 may determine which point is touched on the display 241.

The audio output unit 242 may output audio data received from the second wireless communication unit 210 or stored in the memory 250 in call signal receiving, a call or record mode, a voice recognizing mode and a broadcasting receive mode. The audio output unit 242 may output an audio signal associated with functions performed by the external terminal 200 (e.g., a call signal receiving sound and a message receiving sound). Such the audio output unit 242 may include a receiver, a speaker and a buzzer.

The alarm unit 243 outputs signal for notifying event generation of the external terminal 200. Examples of the event generated in the external terminal 200 may include call signal receiving, message receiving, key signal input and touch input. The alarm unit 243 may also output another type signal rather than the video or audio signal. The alarm unit 243 may output a vibration signal for notifying the event generation. The video or audio signal may be output even via the display 241 or the audio output module 242 and both of the display 241 and the audio output module 242 may be categorized as the alarm unit 243.

The haptic module 244 generates various tactile or haptic effects sensed by the user. A typical example of the haptic effects generated by the haptic module 244 may be vibration. Intensity and a pattern of the vibration generated by the haptic module 244 may be controllable. For example, different vibrations may be compounded and output or they may be sequentially output.

The memory 250 may store a program for operating the terminal controller 270 or temporarily store input/output data (e.g., a phone book, a message, a still image and a motion picture) therein. The memory 250 may store various patterned vibrations and sounds output after the touch input.

The memory 250 may include at least one of storage medium including a flash memory type, a hard disk type, a multimedia card micro type, a card type memory (e.g., a SD or XD memory), RAM (Random Access Memory), SRAM (static Random Access Memory), PROM (Programmable Read-Only Memory), MRAM (Magnetic Random Access Memory), a magnetic disk and an optical disk. The external terminal 200 may be operated in association with a web storage performing a storage function of the memory 250 on an internet The interface unit 260 may be employed as a passage to all of the external devices connected with the external terminal 200. The interface 260 may be provided with data or the power by the external devices and transmit the data or power to each of the elements or transmit data of the external terminal 200 to the external device. for example, the interface unit 260 may include a wire/wireless headset port, an external charger port, a wire/wireless data port, a memory card port, a port for connecting a device having an identify module, an audio I/O (Input/output) port, a video I/O port and an earphone port.

The identify module is a chip storing a variety of information therein to identify an authority for use of the external terminal 200. The identification module may include SIM (Subscriber Identify Module) and USIM (Universal Subscriber Identity Module). A device having the identify module (hereinafter, "identify device") may be fabricated to be a smart card. Accordingly, the identify device may be connected to the external terminal 200 via a port.

The terminal controller 270 typically controls an overall operation of the remote control device. For example, the terminal controller 270 performs control and process associated with voice call, data communication and video call. The terminal controller 270 may include a multimedia module 271 for playing multimedia. The multimedia module 271 may be realized in the terminal controller 270 or separately realized.

The terminal controller 270 may process pattern recognition for recognizing handwriting input or drawing input performed on a touch screen as characters and images.

The power supply unit 280 may be provided with an external power or internal power in accordance with the control of the controller 270 and supply a power required by the operation of the components.

The embodiment of the present disclosure may be realized in a computer or readable media similar to the computer, using software, a hardware or combination of the software and the hardware.

In hardware realization, the embodiments described herewith may be realized by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro-controllers, microprocessors and electric units for performing other functions. In some cases, the embodiments may be realized by the terminal controller 270.

In software realization, embodiments such as processes and functions may be realized together with an auxiliary software module performing one or more functions or operations. A software code may be realized by a software application written in a proper program language. The software code may be stored in the memory 250 and performed by the terminal controller 270. The application may include a specific application for controlling the robot cleaner 100 mentioned above.

Figure 6:
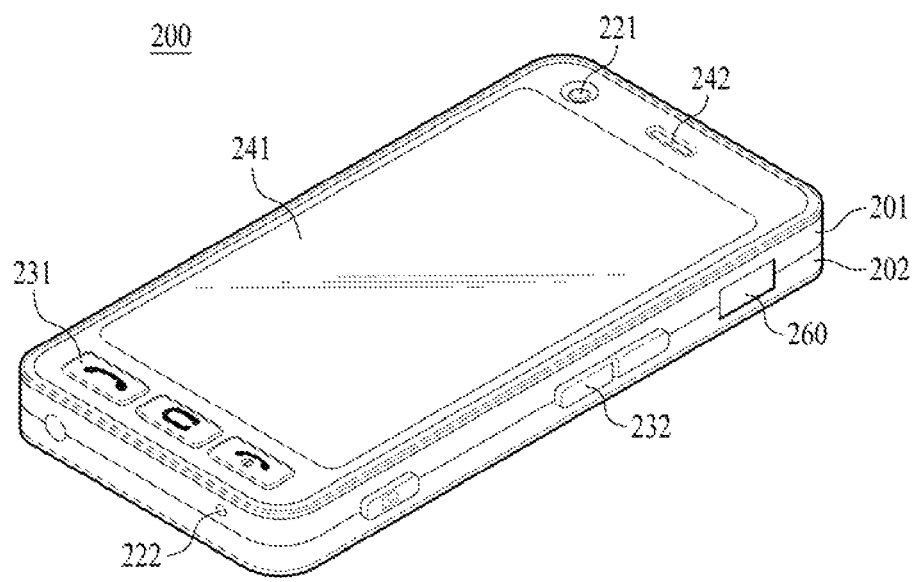
FIG. 6 is a front perspective diagram of the remote control device composing the robot cleaner system according to one embodiment of the disclosure, seen in front.

FIG. 6 is a front perspective diagram of the remote control device composing the robot cleaner system according to one embodiment of the disclosure, seen in front.

The external terminal 200 described above includes a bar-shaped body and the embodiments are not limited thereto. The remote control device may be a slide type, a folder type, a swing type and a swivel type, with two or more bodies relative-movably coupled to each other.

The body includes a case (e.g., a casing, a housing and a cover) for defining an exterior appearance of the external terminal 200. In this embodiment, the case may be divided into a front case 201 and a rear case 202. Various electronic components are mounted in a space formed between the front case 201 and the rear case 202. One or more intermediate cases may be additionally arranged between the front case 201 and the rear case 202.

The cases may be injection-molded of synthetic resin or they may be formed of a metallic material (e.g., stainless steel (STS) and titanium (Ti)).

In the body of the external terminal 200, mainly, in the front case 201 may be arranged the display 241, the audio output unit 242, the camera 221, the input units 230/231 and 232, the microphone 222 and the interface 160.

The display 241 occupies most of a main surface possessed by the front case 201. The audio output unit 242 and the camera 221 may be arranged adjacent to one of ends of the display 241. The input unit 231 and the microphone 222 may be arranged adjacent to the other end. The input unit 232 and the interface 160 may be arranged in lateral surfaces of the front and rear cases 201 and 202.

The user input unit 230 may be operated by the user to receive an input command for controlling the operation of the external terminal 200. The user input unit 230 may include a plurality of manipulating units 231 and 232. The manipulating units 231 and 232 may be called as a manipulating portion. Any tactile manners in which the user manipulates, with a tactile sense may be applied.

The contents input by the first or second manipulating units 231 and 232 may be set in various manners. For example, the first manipulating unit 231 receives an input command (e.g., a start command, an end command and a scroll command). The second manipulating unit 232 may receive an input command (e.g., controlling of a sound output from the audio output unit 242 and conversion into a touch recognition mode of the display 241).

Figure 7:
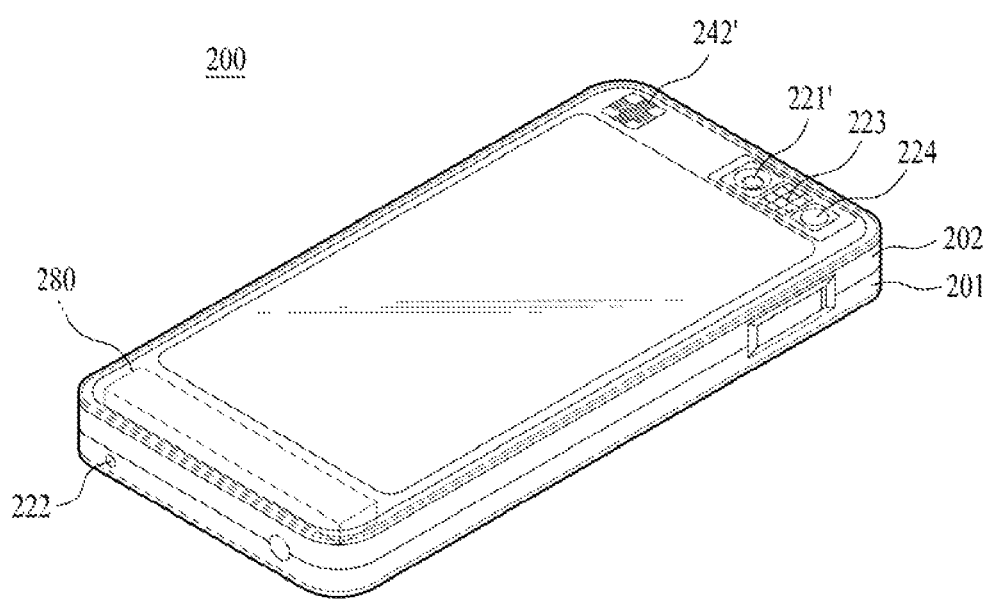
FIG. 7 is a rear perspective diagram of the remote control device composing the robot cleaner according to one embodiment of the disclosure.

FIG. 7 is a rear perspective diagram of the remote control device composing the robot cleaner according to one embodiment of the disclosure.

Referring to FIG. 7, a camera 221' may be additionally mounted in a rear surface of the body possessed by the external terminal 200, in other words, in the rear case 202. The camera 221' may have a photographing direction substantially opposite to a photographing direction of the camera (221, see FIG. 6) and it may have pixels different from the pixels of the camera 221.

For example, the camera 221 may have low pixels which cause no problems in transmitting a photograph of the user's face to the other opponent on a video call. The camera 221' may have high pixels because it is often not to transmit a conventional object immediately after photographing. The camera 221' may be coupled to the body of the external terminal 200 with rotatable or being able to pop up.

A flash 123 and a mirror 124 may be additionally arranged adjacent to the camera 221'. The flash 123 flashes a light upon an object when the camera 221' photographs an object. The user may reflect the face in the mirror 124 when trying to photograph himself or herself (in other words, self-photograph).

An audio output unit 242' may be additionally arranged in a rear surface of the body possessed by the external terminal 200. The audio output unit 242' may realize a stereo function, together with the audio output unit (242, see FIG. 6). The audio output unit 242' may be used in realizing a speaker phone during the call.

A power supply unit 280 may be mounted to the body of the external terminal 200 to supply a power to the external terminal 200. The power supply unit 280 may be mounted in the body of the external terminal 200 or directly and detachably coupled to an outer surface of the body possessed by the external terminal 200.

Figure 8:
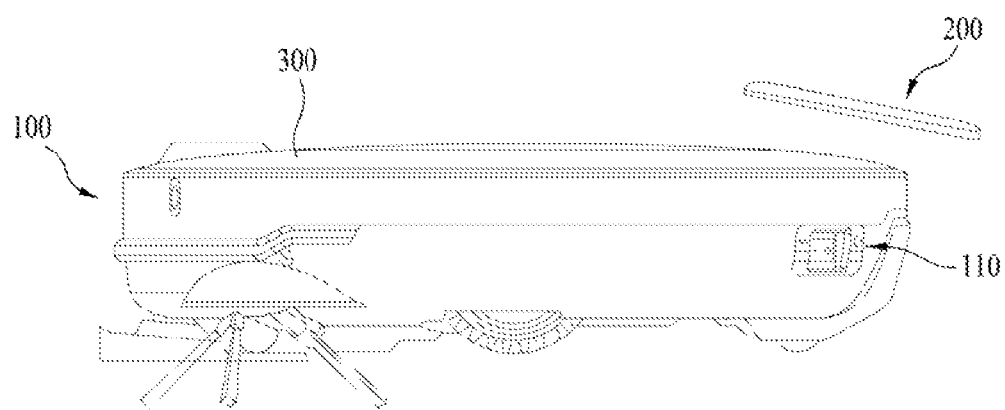
FIG. 8 is a side view illustrating NFC communication between an external terminal and the robot cleaner according to one embodiment of the disclosure.

Hereinafter, referring to FIG. 8, a robot cleaner system according to one embodiment of the present disclosure will be described.

As shown in the drawing, the robot cleaner system may include a robot cleaner 100 and an external terminal 200.

The robot cleaner 100 and the external terminal 200 may be equal to or similar to the robot cleaner and the external terminal 200 mentioned above.

First of all, the external terminal 200 may be located in a specific position over the robot cleaner 100. Not even in contact, the external terminal 200 is located in a preset range of distances. The AP information of the robot cleaner 100 may be transmitted to the external terminal 200 via the NFC module of the robot cleaner 100 easily. In other words, even if not recognizing or memorizing the AP information, the user may locate the external device 200 near the robot cleaner 100 and the AP information may be transmitted to the external terminal 200.

It may be preferable that a specific position of the robot cleaner 100 is the position where the NFC module of the robot cleaner 100 is mounted. The specific position may be an upper surface of the robot cleaner 100, for the user to locate the external terminal 100 in the specific position easily. Accordingly, a NFC tag antenna of the NFC module may be located toward an upper surface of the robot cleaner.

Hereinafter, referring to FIGS. 9 through 12, the mounting structure of the NFC module 198 and the Wi-Fi module 190 in the robot cleaner 100 will be described in detail.

Figure 9:
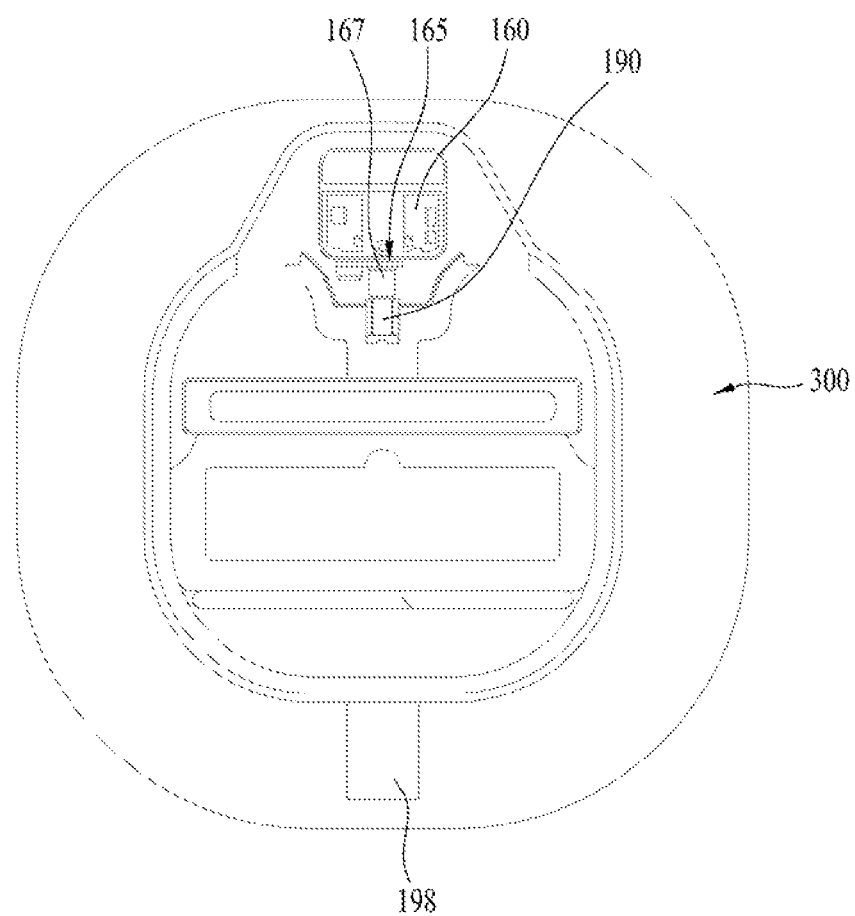
FIG. 9 is a plane view illustrating a rear surface of an upper cover provided in the robot cleaner.

In FIG. 9, a rear surface of the upper cover 300 provided in the robot cleaner is shown. The upper cover 300 may form the upper surface of the robot cleaner 100. Accordingly, the structure of the upper cover 300 may be the structure in which the user can approach most easily and which forms the outer surface of the robot cleaner, especially, an upper surface of the robot cleaner.

First of all, referring to FIGS. 9 through 12, a mounting structure of the NFC module will be described in detail.

The NFC module may be formed of a board and a NFC Tag antenna may be formed in the NFC module. The antenna may be mounted in the rear surface of the upper cover 300 to face the upper surface of the robot cleaner 100. The NFC module 198 may be mounted through a hook 199 formed in the upper cover 300.

The upper cover 300 may be formed of a plastic molding and it is not so thick. Accordingly, a distance between the NFC module 198 and an outer surface of the upper cover 300 is not so far. For example, the distance may be within 10 mm. In other words, the NFC module 198 may be located in the outer surface of the upper cover 100 deep within 10 mm.

Even without a metallic material disposed between the NFC module 198 and the upper cover, a quite short distance may be kept. That means that the communication between the external terminal and the NFC module 198 may be performed very easily. Only when the external device is located only to a position having a preset distance near the upper cover, the NFC communication may be performed. Accordingly, damage to the upper cover or the surface of the external terminal caused by the contact may be prevented.

Meanwhile, the upper cover may have a central portion convex upward. Accordingly, both ends of the upper cover 300 have a height different from a height of the NFC module. Such a height difference may form a distance between the NFC module and the components of the robot cleaner located under the NFC module.

Accordingly, a front surface of the NFC module 198 may be as close as possible to an outer surface of the robot cleaner and a distance between the rear surface and the other components of the robot cleaner may be secured. That means noise causing elements of the NFC communication can be reduced remarkably. That is because the metallic material near the NFC module, especially, the antenna may have a bad influence on the NFC communication.

Figure 12:
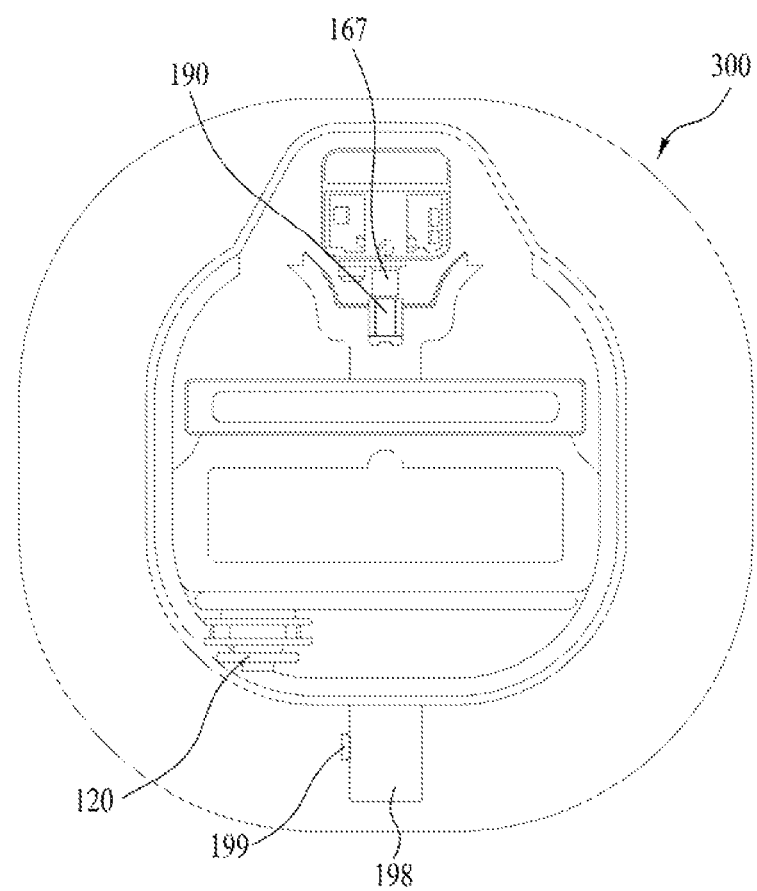
FIG. 12 is a plane view a location relation among a main controller, a Wi-Fi module and a NFC module in the upper cover.

In FIG. 12, the suction device 120 is shown. The suction device 120 may be mounted in the case 110. Accordingly, FIG. 12 illustrates a location relation between the NFC module 198 and the suction device 120 in a state where the robot cleaner is completely assembled.

The suction device 120 may include a metallic blade. The minimum distance has to be secured between the blade and the NFC module 198 sufficiently. That is because noise of NFC communication can be caused by the blade.

As mentioned above, the NFC module is mounted in the upper cover having a central portion convex upward, especially, in front or behind the upper cover. The suction device 120 may be mounted in the case 110 coupled to a lower portion of the upper cover 300.

Hereinafter, referring to FIGS. 9 through 11, the mounting structure of the Wi-Fi module 190 will be described in detail.

As shown in the drawing, a wireless LAN card 190 may be realized as the Wi-Fi module 190 and a required board may be vision controller 165. Accordingly, the LAN card 190 may be mounted in the vision controller 165.

A distance between the wireless LAN card 190 and the main controller 160 may be 100 mm or less to reduce communication noise. The wireless LAN card 190 may be mounted in the rear surface of the upper cover 300 like the NFC module 198 mentioned above.

Specifically, a user UI may be provided in front of or behind the upper cover 300. Accordingly, the main controller 160 may be in front of or behind the upper cover 300. The NFC module 198 may be mounted behind or in front of the upper cover 300 which is the opposite position of the wireless LAN card 190.

The wireless LAN card 190 may be a USB dongle type such that the wireless LAN card 190 may be insertedly coupled to a USB port 167 formed in the board. Such a structure may prevent the wireless LAN card 190 from being decoupled from the board.

Meanwhile, the board composing the vision controller 165 may be also secured to the upper cover 300 stably, as well as the board composing the wireless LAN card 190. The vision controller 165 may be coupled to the main controller 160 in a direction where the vision controller 165 is coupled.

Figure 10:
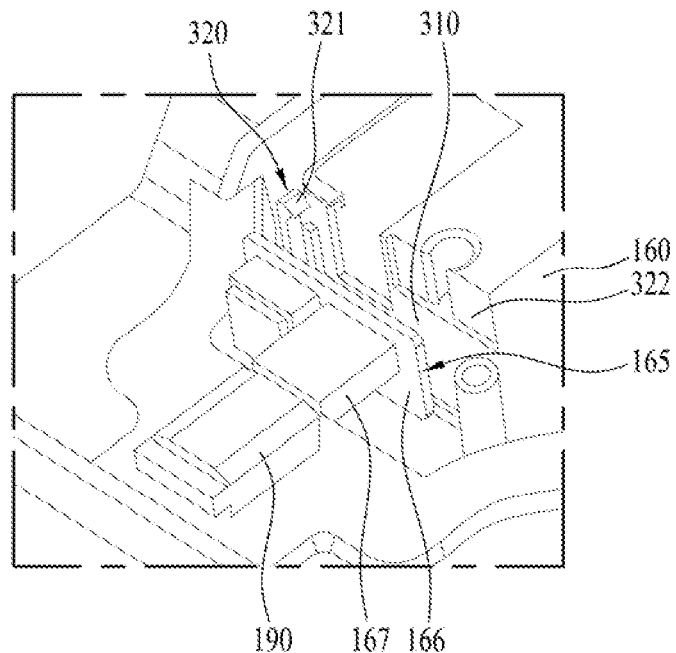
FIG. 10 is an enlarged perspective diagram of a wireless LAN card starting to be coupled to the upper cover.
Figure 11:
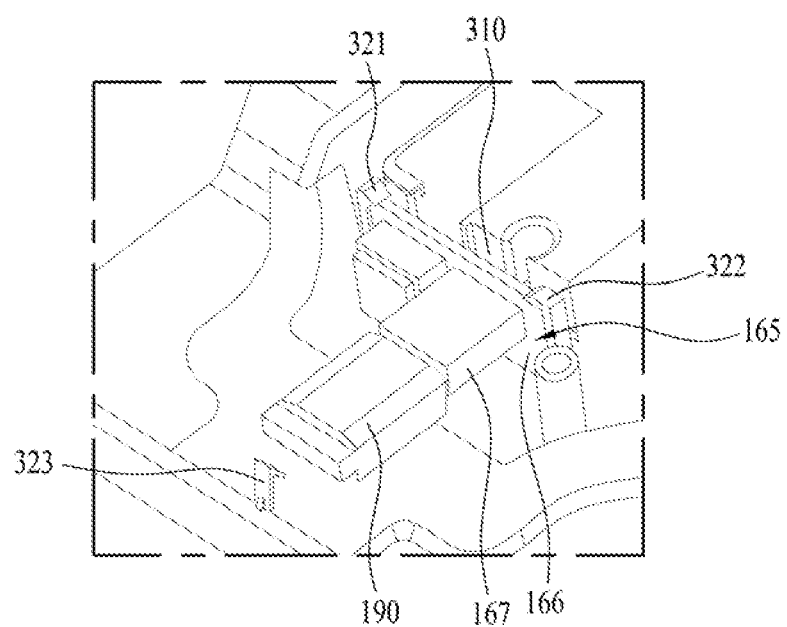
FIG. 11 is an enlarged perspective diagram of the wireless LAN card just before coupled to the upper cover.

Referring to FIGS. 10 and 11, a coupling relation among the wireless LAN card 190, the board and the upper cover will be described in detail.

First of all, the board, for example, a board 166 composing the vision controller 165 may be provided vertically and a USB port 167 may be formed perpendicular to the board 166, in other words, in a horizontal direction.

As the wireless LAN card 190 moves in a direction where it is coupled to the USB port 167 such that the wireless LAN card 190 and the USB port 167 may be coupled to each other and that the wireless LAN card 190 and the board 166 may integrally move.

Such the motion may allow the wireless LAN card 190 coupled to the board 166. Alternatively, the board 166 may be coupled to the main controller 160.

A short edge may be formed to restrict the motion of the board and the wireless LAN card 190. In other words, the short edge 310 may be formed in a rear surface of the upper cover 300 to restrict the horizontal motion. As the board is pushed to move to the short edge 310, the coupling between the wireless LAN card 190 and the board may be completed. Also, the coupling between the board and the main controller may be completed.

Meanwhile, the coupling between the board and the wireless LAN card 190 requires secure fixing. In other words, the longitudinal motion or rotation needs to be prevented. Accordingly, a hook 320 may be formed to secure the board and the wireless LAN card integrally coupled to each other. The hook 320 may be formed in the rear surface of the upper cover 300 to fix the board and the wireless LAN card integrally. The plurality of the hooks 320 may be provided, which will be described in detail later.

When the wireless LAN card 190 is moved in a direction to be coupled to the USB port 167 as shown in FIG. 10, board hooks 321 and 322 may be formed in both sides of the board. The board hooks may fix both sides of the board. When the board is moved to the short edge 310, the board may be coupled to the board hooks. Accordingly, the board may be prevented from rotating by the board hooks.

Meanwhile, when the board and the board hooks are coupled to each other as shown in FIG. 11, the wireless LAN card may be coupled to a wireless LAN card hook 323.

The wireless LAN hook 323 may be a hook 323 to couple the wireless LAN card moving downward thereto. The wireless LAN card hook 323 may be block a rear portion of the wireless LAN card 190.

Accordingly, when the wireless LAN card is coupled to the board via the hooks, the rotation and forward-and-backward motion thereof may be prevented.

Specifically, at least three or more hooks 320 may be provided and such hooks may form three or more supporting spots. For examples, the supporting spots may form a triangle.

The forward-and-backward motion may be prevented by the short edge 310 and the wireless LAN card hook 323. The rotation may be prevented by the board hooks 321 and 322. In other words, the wireless LAN card and the board integrally coupled to each other may be prevented from moving and rotating.

Even when a shock is applied to the robot cleaner, the wireless LAN card 190 may be prevented from separating from the board. Also, the board 166 may be prevented from separating from the main controller effectively.

The coupling direction between the USB type wireless LAN card and the UBS port may be realized as substantially horizontal. That means that a longitudinal direction of the wireless LAN card is a horizontal direction. Accordingly, the height of the robot cleaner may be prevented from increasing. The coupling between the wireless LAN card and the board and the fixing structure of the two elements to the upper cover can be performed easily.

Hereinafter, a control method of the robot cleaner through the external terminal will be described.

The robot cleaner has to communicate the external terminal to be controlled through the external terminal by the user. The robot cleaner may provide a self AP function. The external terminal has to have the AP information to access to the AP.

Accordingly, to transmit the AP information to the external terminal easily, the robot cleaner may transmit the AP information of the Wi-Fi module embedded in the case to the external device through the NFC module.

The external terminal transmits the AP information to the robot cleaner and the robot cleaner may authenticate the external terminal based on the AP information received from the external terminal. In other words, the external terminal connects to the AP.

When the access and the authentication are performed, the robot cleaner may Wi-Fi communicate with the external terminal. In other words, the both may Wi-Fi communicate with each other via the AP provided by the robot cleaner itself. Remote control of the robot cleaner may be performed on the external terminal via such the Wi-Fi communication.

The control of the robot cleaner through the steps means that the user can directly control the robot cleaner nearby, in other words, in an area where Wi-Fi communication can be performed via the AP of the robot cleaner. For example, the control of the robot cleaner may be performed in the area recognized by the user.

Accordingly, the other person is prevented from controlling the robot cleaner discretionarily. Also, even if the other person controls the robot cleaner discretionarily, the user can find the other person's control easily.

Meanwhile, the AP information of the robot cleaner may be transmitted to the external terminal only when the user approaches the external terminal near the robot cleaner. In other words, the transmission of the AP information from the robot cleaner to the external terminal may be performed in the range of the areas recognized by the user. In many cases except the case of the other person's trespassing on the house, the user may receive the information and the information may be transmitted at least under the user's eyes.

The robot cleaner may be controlled in the range of the areas recognized by the user and the user may control the robot cleaner easily at the same time. In other words, only when the external terminal is located near the robot cleaner very simply, the robot cleaner and the external terminal can communicate with each other. Specifically, troublesome and complex manual AP input may be excluded.

In this instance, the control of the robot cleaner through the external terminal may include remote controlling and/or monitoring via state information of the robot cleaner. Such the control may be performed via the Wi-Fi communication mentioned above.

Hereinafter, a control method of the robot cleaner system including the external terminal and the robot cleaner will be described.

First of all, to control the robot cleaner through the external terminal, the information on the robot cleaner has to be stored in the external terminal. That is because a specific robot cleaner is controlled through the external terminal, in other words, a control object has to be specified.

The specification of the control object may be performed based on the robot cleaner information and such the robot cleaner information may include AP information. That may be the information on the self AP provided by the robot cleaner. Such the AP information is specific information and the robot cleaner as the control object may be specified.

A step of storing the robot cleaner information stored in the external terminal may be performed through the communication between the NFC module of the external terminal and the NFC module of the robot cleaner having the recorded robot cleaner information which includes information of the Wi-Fi module embedded in the case of the robot cleaner.

The robot cleaner information may include a plurality of pieces, because a plurality of robot cleaners can be provided in a house rarely. The user may select information on a specific robot cleaner or a menu displaying the information of the specific robot cleaner, to specify a robot cleaner as a control object. In other words, a step of selecting a robot cleaner as a remote control object based on the received information of the robot cleaner may be performed.

When the user selects a robot cleaner as a control object through the external terminal, the external terminal transmits AP information to the robot cleaner. In other words, the external terminal tries to access to the robot cleaner. The robot cleaner authenticates the external terminal based on the received AP information to allow Wi-Fi communication with the external terminal.

After the access and the authentication, the Wi-Fi modules of the two may perform the Wi-Fi communication. The control of the robot cleaner may be performed by the user via the Wi-Fi communication, using the external terminal.

Accordingly, in the embodiment of the present disclosure may be provided the robot cleaner and the robot cleaner system, which includes the NFC module performing relatively short range communication for instant communication and the Wi-Fi module for performing relatively remote range communication for continuous communication in controlling.

Also there may be provided the robot cleaner and the robot cleaner system, which may perform independent positions and coupling as well as independent controlling and signal processing. Accordingly, the robot cleaner and the robot cleaner system including such the modules maybe provided easily. The communication or signal processing between the two modules may not be required such that a control logic structure cannot be complex.

Exemplary embodiments of the disclosed subject matter are described herein with reference to cross-region illustrations that are schematic illustrations of idealized embodiments (and intermediate structures) of the disclosed subject matter. As such, variations from the shapes of the illustrations as a result, for example, of manufacturing techniques and/or tolerances, are to be expected. Thus, exemplary embodiments of the disclosed subject matter should not be construed as limited to the particular shapes of regions illustrated herein but are to include deviations in shapes that result, for example, from manufacturing.

Exemplary embodiments of the present disclosure provide a robot cleaner and overcome the disadvantages of the robot cleaner and the robot cleaner system mentioned above.

Exemplary embodiments of the present disclosure also provide a robot cleaner of which a cleaning history (e.g., an area where the robot cleaner cleaned and a moving path of the robot cleaner) may be easily figured out by a user and a robot cleaner system including the same.

Exemplary embodiments of the present disclosure also provide a robot cleaner of which a cleaning history may be recognized by the user visually and which plays a video file type cleaning history to enhance user satisfaction, and a robot cleaner system including the same.

Exemplary embodiments of the present disclosure also provide a robot cleaner which may be used conveniently with no auxiliary device for wireless communication except a cleaner and an external terminal, regardless of an installation environment, and a robot cleaner system including the same.

Exemplary embodiments of the present disclosure also provide a robot cleaner of which a Wi-Fi module may be coupled and secured easily and which may perform NFC communication easily via the NFC module, and a robot cleaner system including the same.

Exemplary embodiments of the present disclosure also provide a robot cleaner which includes a communication module as a prerequisite for communication for control and which may be realized easily, with easy usage, and a robot cleaner system including the same.

To achieve these objects and other advantages and in accordance with the purpose of the disclosure, as embodied and broadly described herein, a robot cleaner includes a case; a suction device provided in the case; a suction nozzle for sucking dust from a floor by driving of the suction device; a dust collection device for collecting foreign substances contained in the air sucked via the suction nozzle; a wheel unit for allowing the case to drive automatically; a main controller for controlling the driving of the suction device and the wheel unit; a Wi-Fi module provided in the case to provide Access Point (AP); and a NFC module provided in the case to provide AP information for accessing to the AP through NFC communication, wherein the AP information received from the external terminal is authenticated to allow the robot cleaner to Wi-Fi communicate with the external terminal.

The Wi-Fi module may provide the main controller with a control signal received from the external terminal and provides the external terminal with state information of the robot cleaner.

The Wi-Fi module and the NFC module may be provided in the case individually, spaced apart a preset distance from each other.

The AP information may include AP SSID and a security key.

Communication between the Wi-Fi module and the NFC module may be excluded and only power supply to the NFC module is controlled by the main controller.

The robot cleaner may further include a camera module provided in the case to capture an environmental view thereof; and a vision controller for generating location information based on the image information generated in the camera module, wherein the Wi-Fi module is mounted in the vision controller.

The Wi-Fi module may communicate with the vision controller via serial communication, and the vision controller may communicate with the main controller via serial communication.

The Wi-Fi module may communicate with the vision controller via USB serial communication. Accordingly, the Wi-Fi module may be realized easily.

The case may include an upper cover for defining an upper exterior appearance of the robot cleaner, and the NFC module is mounted in a rear surface of the upper cover.

The Wi-Fi module may be provided in front or behind the rear surface of the upper cover, and the NFC module may be provided behind or in front of the upper cover which is an opposite position of the Wi-Fi module.

The Wi-Fi module may include an USB type wireless LAN card, and in the rear surface of the upper cover, a board hook for fixing the board as the wireless LAN card and the board may be moved in a direction where the wireless LAN card is coupled to the board; and a wireless LAN card hook for fixing the wireless LAN card as the wireless LAN card may be moved downward, after the board is coupled to the board hook.

The board hook may be formed in each of right and left ends of the board, and the wireless LAN card may be formed in a portion where the left and right board hooks form a triangle, and the Wi-Fi module may be secured to the upper cover by the board hook and the wireless LAN card hook, with at least three supporting spots, in a state where the wireless LAN card and the board are integrally coupled to each other.

Exemplary embodiments of the present disclosure also provide a robot cleaner including a case comprising an upper cover for defining an upper exterior appearance of the robot cleaner; a suction device provided in the case; a dust collection device for collecting foreign substances contained in the air sucked via the suction nozzle; a wheel unit provided to drive the case automatically; a main controller for controlling the driving of the suction device and the wheel unit; a Wi-Fi module comprising a wireless LAN card for providing Access Point (AP) and a board connected to the wireless LAN card, the Wi-Fi module coupled to a rear surface of the upper cover in a state of being connected to the board; and a NFC module coupled to the rear surface of the upper cover in an opposite position of the Wi-Fi module, the NFC module for providing AP information for accessing to the AP via NFC communication to an external terminal, wherein the AP information received from the external terminal is authenticated to allow the robot cleaner to Wi-Fi communicate with the external terminal.

At least three or more hooks may be formed in the upper cover to secure the Wi-Fi module.

The hooks may include a board hook for fixing the board as the wireless LAN card and the board are moved in a direction (a forward direction) where the wireless LAN card is connected to the board; and a wireless LAN card hook for fixing the wireless LAN card as the wireless LAN card is moved downward after the board is coupled to the board hook.

The hooks may include a front hook for restricting forward-and-backward motion of the wireless LAN card and the board; and at least two lateral hooks for restricting lateral motion of the wireless LAN card and the board.

The front hook may be the wireless LAN card hook and the lateral hook may be the board hook.

Exemplary embodiments of the present disclosure may also provide a control method of a robot cleaner including transmitting AP information of a Wi-Fi module embedded in a case of the robot cleaner to an external terminal via a NFC module; allowing the external terminal to access to the AP based on the AP information received from the external terminal; and Wi-Fi communicating with the external terminal via the AP.

In the communicating step, remote control of the robot cleaner through the external terminal and/or monitoring of state information on the robot cleaner may be performed.

Communication between the Wi-Fi module and the NFC module may be excluded, and only power supply to the NFC module may be controlled by the main controller.

Exemplary embodiments of the present disclosure may also provide a control method of a robot cleaner system comprising a robot cleaner and an external terminal for wirelessly communicating with the robot cleaner, the control method including storing information on the robot cleaner in the external terminal via communication between an NFC module of the external terminal and an NFC module of the robot cleaner, where information on the robot cleaner comprising AP information of a Wi-Fi module embedded in a case of the robot cleaner is recorded; selecting a robot cleaner as a remote control object through the external terminal based on the received information on the robot cleaner; accessing to the AP by allowing the external terminal to transmit the AP information to the selected robot cleaner; and performing Wi-Fi communication between a Wi-Fi module of the robot cleaner and a Wi-Fi module of the external terminal.

Exemplary embodiments of the present disclosure also provide a robot cleaner of which a cleaning history (e.g., an area where the robot cleaner cleaned and a moving path of the robot cleaner) may be easily figured out by a user and a robot cleaner system including the same.

Exemplary embodiments of the present disclosure also provide a robot cleaner of which a cleaning history may be recognized by the user visually and which plays a video file type cleaning history to enhance user satisfaction, and a robot cleaner system including the same.

Exemplary embodiments of the present disclosure also provide a robot cleaner which may be used conveniently with no auxiliary device for wireless communication except a cleaner and an external terminal, regardless of an installation environment, and a robot cleaner system including the same.

Exemplary embodiments of the present disclosure also provide a robot cleaner of which a Wi-Fi module may be coupled and secured easily and which may perform NFC communication easily via the NFC module, and a robot cleaner system including the same.

Exemplary embodiments of the present disclosure also provide a robot cleaner which includes a communication module as a prerequisite for communication for control and which may be realized easily, with easy usage, and a robot cleaner system including the same.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot cleaner comprising:
   a case including an upper cover configured to define an upper exterior appearance of the robot cleaner;
   a suction device provided in the case;
   a suction nozzle configured to suck dust from a floor by driving of the suction device;
   a dust collection device configured to collect foreign substances contained in the air sucked via the suction nozzle;
   a wheel unit configured to allow movement of the robot cleaner;
   a main controller configured to control the driving of the suction device and the wheel unit;
   a Wi-Fi module provided in the case and configured to provide an Access Point (AP); and
   a NFC module provided in the case and configured to provide an external terminal with AP information for access to the AP through NFC communication, wherein when the AP information received from the external terminal is authenticated, a Wi-Fi communication between an external terminal and the main controller is enabled, and wherein the Wi-Fi module is provided in front or behind a rear surface of the upper cover, and the NFC module is provided behind or in front of the rear surface of the upper cover which is an opposite position of the Wi-Fi module.

2. The robot cleaner of claim 1, wherein the Wi-Fi module provides the main controller with a control signal received from the external terminal and provides the external terminal with state information of the robot cleaner.

3. The robot cleaner of claim 1, wherein the Wi-Fi module and the NFC module are separately provided in the case, and are spaced apart from each other by a preset distance.

4. The robot cleaner of claim 1, wherein the AP information comprises AP SSID and a security key.

5. The robot cleaner of claim 1, wherein when communication of the Wi-Fi module and the NFC module is not enabled, power to the NFC module is provided through the main controller.

6. The robot cleaner of claim 1, further comprising:
a camera module provided in the case to provide surrounding view thereof; and
a vision controller configured to generate location information based on information of surrounding view generated by the camera module,
wherein the Wi-Fi module is mounted with the vision controller.

7. The robot cleaner of claim 6, wherein the Wi-Fi module communicates with the vision controller via serial communication, and
the vision controller communicates with the main controller via serial communication.

8. The robot cleaner of claim 7, wherein the Wi-Fi module communicates with the vision controller via USB serial communication.

9. The robot cleaner of claim 1, wherein the Wi-Fi module comprises an USB type wireless LAN card, and wherein a board hook and a wireless LAN card hook are provided in the rear surface of the upper cover,
the board hook being configured to fix the board as the wireless LAN card and the board are moved in a direction where the wireless LAN card is coupled to the board; and
the wireless LAN card hook being configured to fix the wireless LAN card as the wireless LAN card is moved downward after the board is coupled to the board hook.

10. The robot cleaner of claim 9, wherein the board hook includes right and left hooks, and
the wireless LAN card is fixed in position in a first direction by the left and right hooks, and fixed in position in a second direction by the wireless LAN card hook.

11. A robot cleaner comprising:
a case including an upper cover serving as an upper exterior appearance of the robot cleaner;
a suction device provided in the case;
a dust collection device configured to collect foreign substances contained in the air sucked via the suction device;
a wheel unit provided to allow movement of the robot cleaner;
a main controller configured to control the suction device and the wheel unit;
a Wi-Fi module including a wireless LAN card configured to provide an Access Point (AP) and the wireless LAN card connect to a board mounted at a rear surface of the upper cover; and
a NFC module coupled at the rear surface of the upper cover in an opposite position of the Wi-Fi module, the NFC module for providing AP information for accessing to the AP via NFC communication for an external terminal,
wherein when the AP information received from the external terminal is authenticated, Wi-Fi communication with an external terminal is enabled, and
wherein at least three hooks are formed in the upper cover to secure the Wi-Fi module.

12. The robot cleaner of claim 11, wherein the hooks comprise,
a board hook configured to fix the board as the wireless LAN card and the board are moved in a first direction, where the wireless LAN card is connected to the board; and
a wireless LAN card hook configured to fix the wireless LAN card in a second direction after the board is coupled to the board hook in the first direction.

13. The robot cleaner of claim 11, wherein the hooks comprise,
a front hook configured to restrict forward-and-backward motion of the wireless LAN card and the board; and
at least two lateral hooks configured to restrict lateral motion of the wireless LAN card and the board.

* * * * *